Sept. 21, 1937.        L. S. CHILCOTT        2,093,954
TROLLING HOOK
Filed April 30, 1936
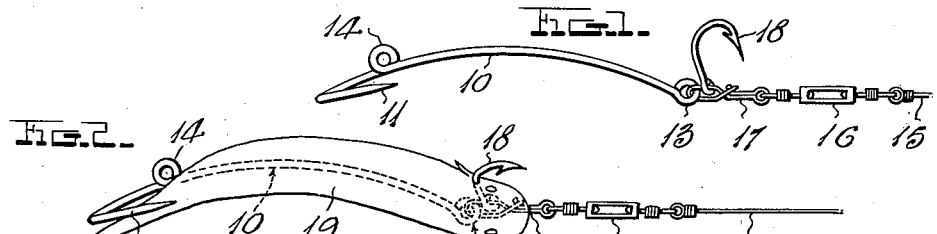
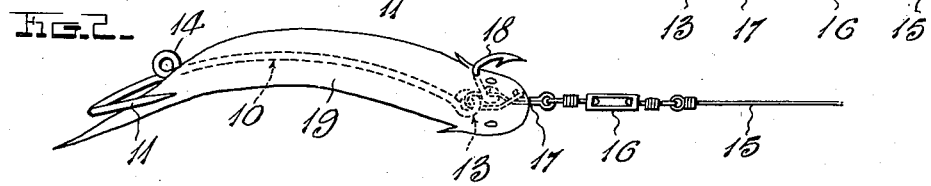
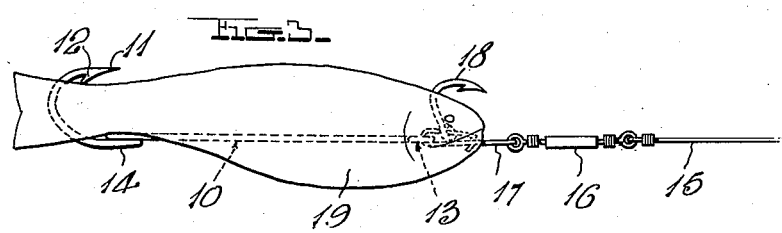
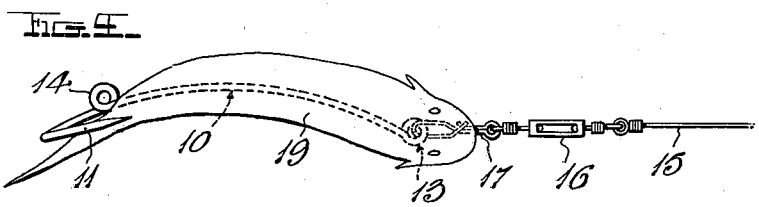
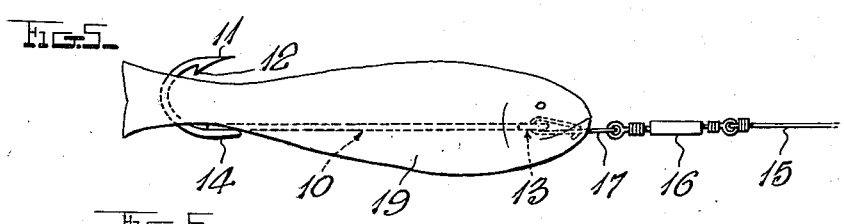
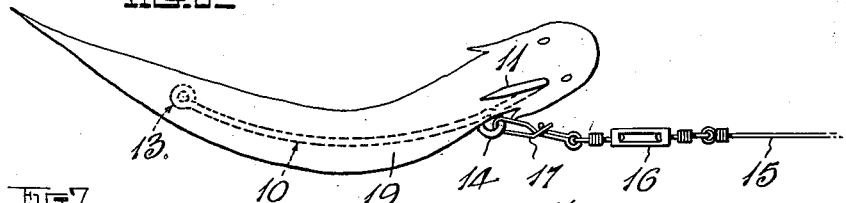
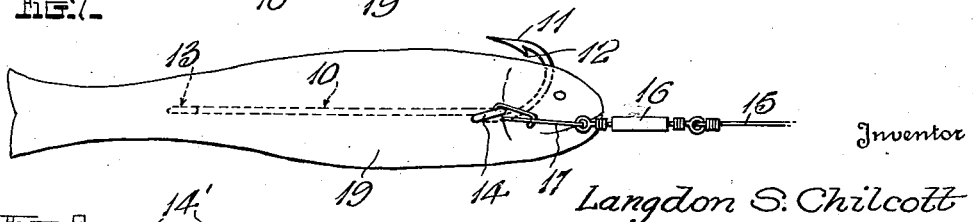
Inventor
Langdon S. Chilcott
By H. B. Willson & Co.
Attorneys
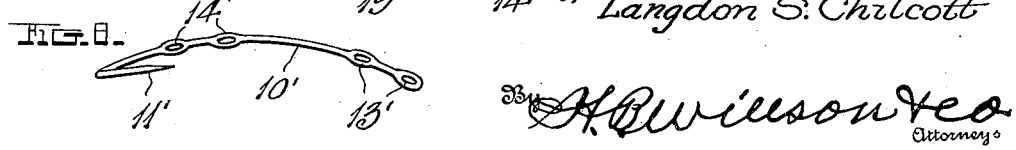

Patented Sept. 21, 1937

2,093,954

UNITED STATES PATENT OFFICE 2,093,954

TROLLING HOOK

Langdon S. Chilcott, Brewer, Maine

Application April 30, 1936, Serial No. 77,230

2 Claims. (Cl. 43—40)

The invention aims primarily to provide a new and improved trolling hook which may be so connected with a minnow as to cause life-like movements thereof during trolling, although it is not essential that the bait be a minnow.

A further object is to provide a hook having at least two eyes at opposite ends of its shank, with either of which the line may be connected according to the manner in which the hook is to be baited, the eye at the hook end of the shank being instrumental in properly positioning the bait on the hook when the other eye is used for attaching the line and serving also to receive a tie if a number of the hooks are to be tied together to form a twin or a triple hook.

A still further aim is to provide a hook which will be hidden to a large extent by the bait, being therefore more efficient.

With the foregoing and minor objects in view, the invention resides in the novel subject matter hereinafter described and claimed, description being accomplished by reference to the accompanying drawing.

Fig. 1 is an edge view showing the hook attached to a line and illustrating an auxiliary hook also.

Fig. 2 is a view similar to Fig. 1 but showing the hook baited.

Fig. 3 is a view of the baited hook looking in a direction at right angles to Fig. 2.

Fig. 4 is a view similar to Fig. 1 without the auxiliary hook.

Fig. 5 is an elevation of the baited hook shown in Fig. 4.

Fig. 6 is a view similar to Figs. 2 and 4 but showing the hook baited in a different manner and illustrating the line connected with the eye at the hook end of the shank, which eye protrudes through one of the gills of the bait.

Fig. 7 is an elevation at right angles to Fig. 6.

Fig. 8 is a view similar to Fig. 1 but illustrating a modified construction.

The hook shown in Figs. 1 to 7 is formed from a single length of wire bent to form a longitudinally curved shank 10 having a conventional return-bend hook 11 and barb 12 at one end, the wire being bent at the opposite end of the shank to provide an eye 13. The curvature of the shank 10 is in a plane at substantially right angles to the plane in which the hook 11 is disposed. Substantially at the juncture of the shank 10 and hook 11, the wire is formed with a small coil providing an additional eye 14, said eye being substantially opposite the pointed end of the hook 11 and being spaced from said pointed hook end equally as far as the shank 10 is spaced from said end. The eye 14 lies substantially in the plane in which lies the curvature of the shank 10, said eye 14 being therefore in a plane at substantially right angles to the plane of the hook 11.

The line 15 which may include a swivel 16, may be attached either to the eye 13 as shown in Figs. 1 to 5, or may be connected with the eye 14 as illustrated in Figs. 6 and 7, any suitable fastener 17 being employed for connecting the line with the eye. If desired, this fastener may also connect an auxiliary hook 18 (Figs. 1, 2, and 3) with the main hook.

In Figs. 2 and 3, the shank 10 passes longitudinally through the bait 19 and the eye 14 abuts the bait at the rear, the line-attaching means extending through the minnow's mouth and the auxiliary hook 18 projecting either through the mouth or part of the flesh.

In Figs. 4 and 5, the hook is baited in the same manner as in Figs. 2 and 3 with the exception that no auxiliary hook 18 is used and engaged with the bait.

In Figs. 6 and 7, the entire shank 10 of the hook is within the minnow 19, the hook 11 passes through a portion of the minnow's head, the eye 14 is exposed at one of the gills, and the line is connected with this eye.

In all instances, the bait is securely held and is maintained in a longitudinally curved position, causing it to spin and dip in a lifelike way during the trolling operation. When the "gill hitch" shown in Figs. 6 and 7 is used, the movements of the bait are greatly accentuated.

In addition to performing the functions so far explained, it will be obvious that the eyes 14 may be used to receive a piece of line or the like if it be desired to tie a plurality of the hooks together to form a "gang" hook or a "cluster" hook.

In Fig. 8, a modified construction has been shown in which two eyes 13' are provided at the front or line end of the shank 10' and two eyes 14' are provided substantially at the juncture of said shank with the hook 11', all of said eyes being formed by slightly flattening the wire and punching openings therethrough. With the exception of the number of eyes and the way of forming them, the hook of Fig. 8 is the same as the hook shown in the other figures.

I claim:—

1. A trolling hook comprising a length of wire bent to form a shank having a return-bend barbed-hook at one end, said shank being approximately four times the length of the hook for reception in a minnow; the end of the shank opposite the hook being provided with an eye which lies within the minnow when the barbed-hook is disposed forwardly and constitutes line-attaching means when said barbed-hook is disposed rearwardly; said shank having a second eye substantially at its juncture with said barbed-hook, said second eye constituting line-attaching means when the barbed-hook is disposed forwardly and constituting a bait stop when said barbed-hook is disposed rearwardly, said shank being longitudinally curved in a plane at right angles to the plane of said return-bend barbed-hook to laterally curve the minnow and thereby cause lifelike movements thereof when trolling.

2. A trolling hook comprising a single length of wire bent to form a longitudinally curved shank, said shank having a conventional return-bend hook and barb at one end, an eye at its other end, and an additional eye substantially at the juncture of the hook and shank, said additional eye being substantially opposite and in widely spaced relation with the pointed end of the hook, the curvature of said shank being disposed in a plane substantially at right angles to the plane in which said hook is disposed, said additional eye being substantially in the same plane with said curvature of said shank.

LANGDON S. CHILCOTT.